United States Patent [19]

Whisenhunt et al.

[11] 4,303,223

[45] Dec. 1, 1981

[54] VALVE FACING FOR SLIDING VALVE ELEMENTS OR THE LIKE

[75] Inventors: Fred S. Whisenhunt; Lloyd J. Street, both of Bethesda, Md.

[73] Assignee: Mueller Co., Decatur, Ill.

[21] Appl. No.: 930,676

[22] Filed: Aug. 3, 1978

Related U.S. Application Data

[63] Continuation of Ser. No. 768,436, Feb. 14, 1977, abandoned.

[51] Int. Cl.³ .............................................. E03B 9/02
[52] U.S. Cl. ..................................... 251/357; 251/358; 251/368; 137/283
[58] Field of Search ................... 137/283, 357, 533.11; 312/296; 264/45.5, 328, 329; 277/228; 251/357, 358, 359, 360, 364, 368

[56] References Cited

U.S. PATENT DOCUMENTS

| | | | |
|---|---|---|---|
| 2,082,348 | 6/1937 | Tarte | 277/228 |
| 2,686,747 | 8/1954 | Wurtz et al. | 277/228 |
| 3,148,895 | 9/1964 | Jasper et al. | 277/228 |
| 3,911,502 | 10/1975 | Boretos | 137/533.11 |
| 3,980,096 | 9/1976 | Ellis et al. | 137/307 |

FOREIGN PATENT DOCUMENTS 1064972  5/1954  France ............................. 277/228

Primary Examiner—H. Jay Spiegel
Attorney, Agent, or Firm—Cushman, Darby & Cushman

[57] ABSTRACT

An improved valve facing for one member of relatively sliding gate valve members. More specifically, the improved valve facing has foamed polymeric core and an impervious and solid polymeric outer surface. This combination provides the necessary resilient and deformable characteristics for effecting a long-life seal between the sliding members of the gate valve. When the valve is a drain valve of a fire hydrant most unexpected results are obtained.

25 Claims, 7 Drawing Figures

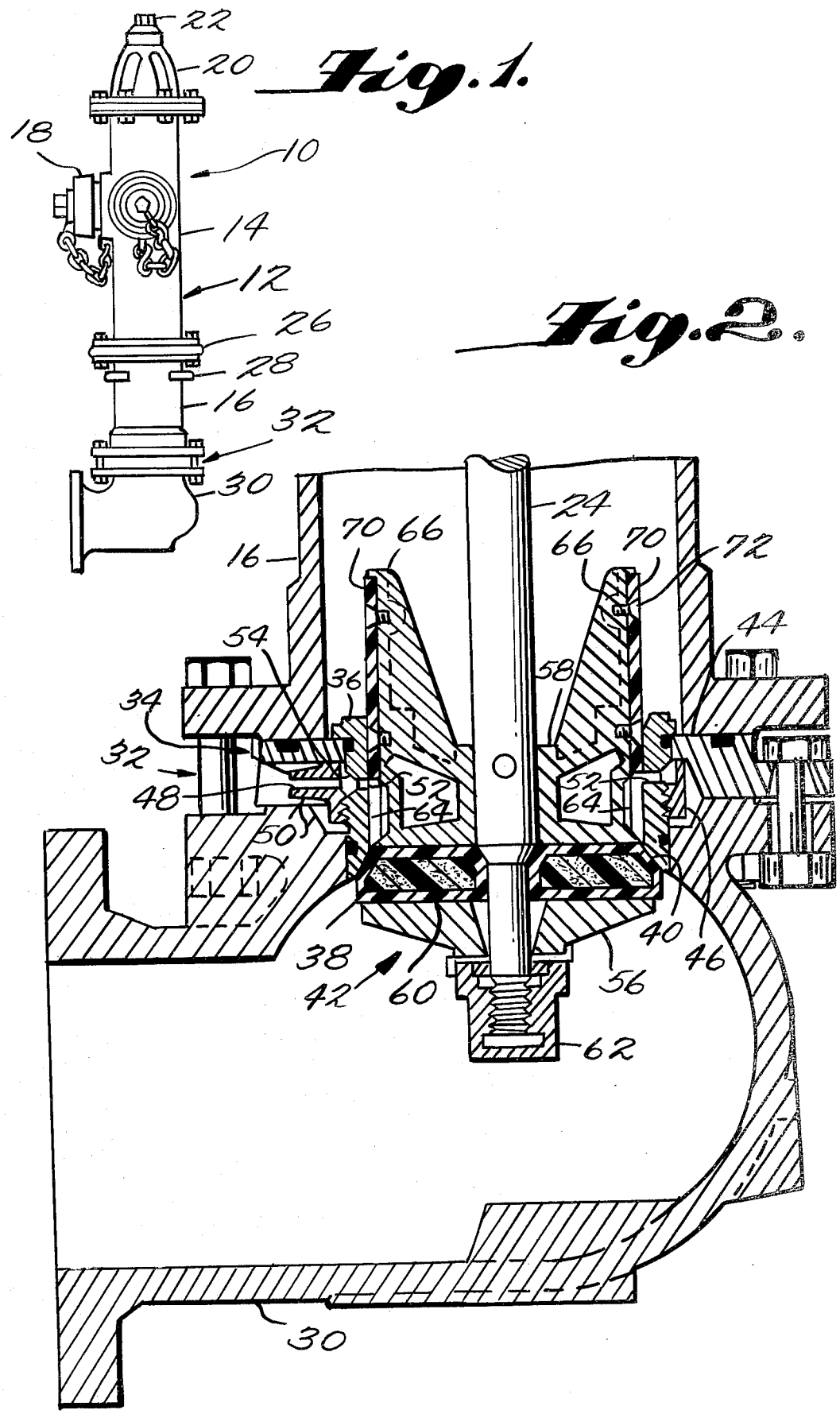

VALVE FACING FOR SLIDING VALVE ELEMENTS OR THE LIKE

This is a continuation, of application Ser. No. 768,436 filed Feb. 14, 1977 now abandoned.

The present invention relates to improvements in valve assemblies having a valve element which is slidably moveable relative to a valve seat so as to open and close the valve, and where either the valve seat or the valve element has a resilient and deformable valve facing for sealing the closed valve against leakage. Specifically, the invention relates to such valve assemblies in the form of a gate valve and more specifically to the form of gate valves used as a fire hydrant drain valve.

BACKGROUND OF THE INVENTION

For many years valve assemblies have been manufactured wherein the valve seat and its cooperating valve element are movable relative to one another by sliding contact to open and close the valve. One of the members of such a valve has been provided with a resilient and deformable valve facing for providing the necessary seal between the members. The facing is conventionally leather, but rubber has also been used. The valve facing must be deformable since it is necessary for effective sealing that the valve facing be very tightly wedged between the valve seat and valve element and to this end the valve facing in the uncompressed configuration is slightly larger than the available space between the valve seat and the valve element. However, the valve facing must also be resilient since it must again expand to the larger uncompressed configuration when the valve is in the opened position so that it may again be tightly wedged into the space between the valve seat and valve element when the valve is in the closed position. Also, since this wedging action places a severe abrasion or shear force on the valve facing, the material of the valve facing must be abrasion resistant in order to provide a minimum acceptable number of cycles of valve opening and closing. Both leather and rubber have acceptable properties in these regards, but on the other hand, the number of cycles of the valve with these materials is much less than would be desired.

A typical type of valve having a valve facing of the present nature is that of the drain valve of a "dry" barrel type of fire hydrant. These drain valves usually consisted of a drain passage from the exterior of the hydrant through the barrel or shoe and through a portion of the main valve seat assembly, the passage opening into the interior of the barrel at a point above the main hydrant valve when the same is closed. A valve facing strip is carried by the movable main valve element of the hydrant. This strip is arranged to have sliding contact with the valve seat assembly so as to close the opening of the drain passage to the interior of the barrel when the main hydrant valve element is moved to the open position.

Conventional leather drain valve facing strips can function effectively in such service, but they do have the serious disadvantage of deteriorating in time and allowing substantial leaking after a relatively low number of cycles of operation of the valve. Thus, they fail due to lack of continued resiliency and lack of abrasion and aging resistance.

More recently, efforts have been made to utilize drain valve facing strips made of rubber. These strips may be of a solid configuration, i.e. having a uniform cross-section somewhat similar to that of conventional leather facing strips, or they may be of a special configuration so that water pressure on one side thereof provides a seal. Both configurations, however, have not proven to be totally satisfactory when used over long periods of time as they have a tendancy to "cold-flow" and the required overall resiliency is lost and leakage occurs. Further, the rubber tends to deteriorate with age and further lose resiliency and abrasion resistance.

More recently, efforts have been made to utilize valve facing strips made of polyethylene, since this material is substantially more resistant to aging than rubber. These strips may be of a solid configuration similar to the leather strips but the very low order of resiliency of the material results in significant leakage with increased numbers of cycles of operation. In an effort to mitigate this problem, the polyethylene strips have been provided with a recessed configuration on one side thereof in order to increase resiliency. While both of the polyethylene strips provide greater numbers of cycles in drain valves than strips made with leather or rubber, they still have undesired increasing leakage with the number of cycles of operation.

PRIOR ART

Prior art relating to fire hydrants and/or gate valves of the present nature and to articles with a foamed core and solid outer surface (and to processes therefore) are:

U.S. Pat. No. 3,980,096—Ellis et al—September 14, 1976
U.S. Pat. No. 3,751,534—Oxley—August 7, 1973
U.S. Pat. No. 3,662,778 —Leopold Jr., et al—May 16, 1972
U.S. Pat. No. 3,630,098—Oxley—December 28, 1971
U.S. Pat. No. 3,531,553—Bodkins—September 29, 1970
U.S. Pat. No. 3,506,027—Dunton—April 14, 1970
U.S. Pat. No. 3,436,446—Angell—April 1, 1969
U.S. Pat. No. 3,268,636—Angell—August 23, 1966
U.S. Pat. No. 2,996,764—Ross et al—August 22, 1961
U.S. Pat. No. 978,385—Lofton—December 13, 1910.

BRIEF SUMMARY OF THE INVENTION

Broadly stated, the present invention relates to valve assemblies having the valve members of a valve seat and valve element which is slidably movable relative to the valve seat to open and close the valve and a resilient and deformable valve facing on one of the valve members whereby the valve facing contacts the other valve member when the valve is closed to seal the closed valve against leakage. The present improvement relates to the valve facing which is comprised of a foamed polymeric core and an impervious and solid polymeric outer surface which overlays the foamed core at every point where the valve facing contacts the other valve member. The foamed core provides resiliency and deformability and the impervious and solid polymeric outer surface provides abrasion resistance. The polymeric material provides aging resistance. These characteristics are maintained for very long periods of time by virtue of the impervious outer surface.

Although the present invention may be utilized on conventional gate valves, it is of particular utility for use on special gate valves such as that described in U.S. Pat. No. 3,662,778. However, the present invention provides most unexpected results in terms of length of useful service when used as a drain valve facing strip for a drain valve of a fire hydrant, an example of a suitable fire hydrant is that described in U.S. Pat. No. 3,980,096, although the invention is not limited to that particular type of fire hydrant. Nevertheless, for sake of simplicity, the present invention will be described in connection with a drain valve of a fire hydrant, and in particular in connection with the drain valve of the fire hydrant of the foregoing U.S. Patent, but it should be understood that the invention extends to the breadth described above and is limited only by the spirit and scope of the annexed claims.

BRIEF DESCRIPTION OF THE DRAWINGS

FIG. 1 is a side elevational view of a fire hydrant embodying the present invention;

FIG. 2 is a fragmentary vertical sectional view on an enlarged scale of the lower portion of the hydrant of FIG. 1, the view illustrating the main hydrant valve in the closed position and the hydrant drain valve in the open position;

DETAILED DESCRIPTION OF THE INVENTION

Figure 3:
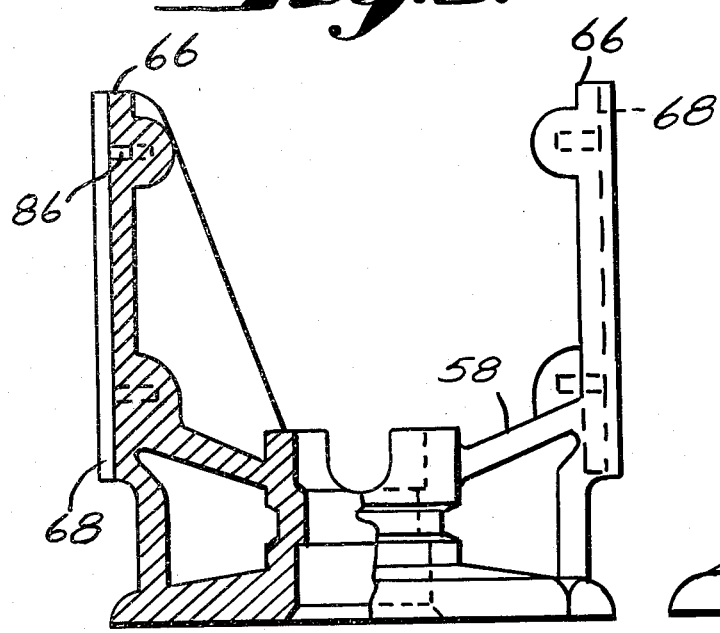
FIG. 3 is an enlarged side elevational view, partly in vertical section, and illustrating the upper valve plate for the main hydrant valve.

Referring now to the drawings wherein like characters and reference numerals represent like or similar parts, there is disclosed in FIG. 1 a fire hydrant generally designated at 10 and having a barrel 12 which is of the sectional type including an upper barrel section 14 and a lower barrel section 16. The upper barrel section 14 is provided with the usual nozzles 18 and with a bonnet or cap 20 through which extends an operating nut 22 operatively connected by means (not shown) to a non-rotating but reciprocating valve stem 24. The upper barrel section 14 is connected to the lower barrel section 16 by the usual frangible connecting ring 26 which is located immediately above the "bury" line 28. A hydrant shoe 30 is detachably connected to the lower barrel section 16 by bolt means 32. (See U.S. Pat. No. 3,980,096 for a detailed description of a typical arrangement of this nature).

As also disclosed in the aforementioned U.S. Pat. No. 3,980,096, the fire hydrant 10 is provided with a hydrant valve seat assembly generally designated at 34 and supported between the lower barrel section 16 and shoe 30, the hydrant valve seat assembly 34 including a brass valve seat ring 36 having a downwardly facing frusto conical seat 38 for cooperating with an upwardly facing frusto conical surface 40 on a main hydrant valve generally designated at 42.

In more detail, the valve seat assembly 34 includes a housing member 44 and a drain ring 46, the drain ring 46 being provided with a drain passage 48. The drain 46 threadably supports the valve seat ring 36 and as fully disclosed in the aforementioned U.S. Pat. No. 3,980,096, the drain ring is provided with at least one lug 50 through which the drain passage 48 extends, the lug 50 being suitably received in a cut-out provided in the housing ring 44. The valve seat ring 36 is provided with drain passage 52 which communicate with an annular drain manifold groove 54 and, thus, it will be appreciated a passageway is provided from the exterior of the hydrant through the passage 48 to the interior of the hydrant through the passages 52 when the main hydrant valve 42 is in the closed position.

Returning now to the description of the main hydrant valve, it includes a lower valve plate 56, an upper valve plate 58 and a valve element 60 sandwiched therebetween, the valve element 60 being made according to the present invention of a foam polyethylene material. The valve element 60 is provided with the frusto conical surface 40 previously mentioned. As will be appreciated, the main hydrant valve 42 is supported on the lower end of the reciprocating valve stem 24 by means of the valve nut assembly 62 and thus when the valve stem 24 reciprocates downwardly, it will cause the main hydrant valve to open to allow water to flow upwardly into the barrel to the hydrant nozzles 18.

Figure 4:
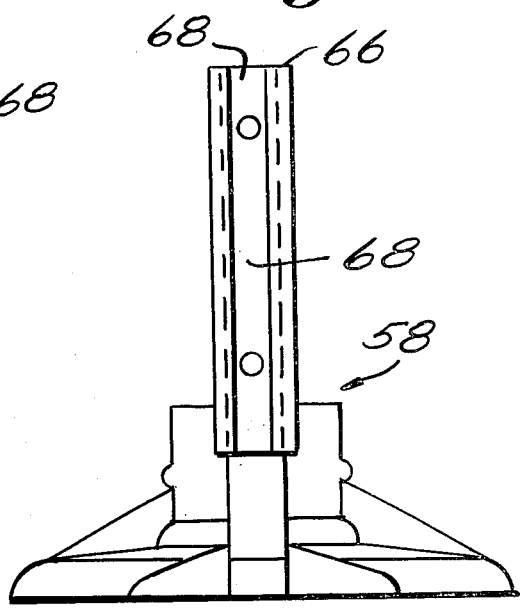
FIG. 4 is an elevational view looking from the left to the right of FIG. 3.

As shown in FIG. 2, the annular brass valve seat ring 36 is provided with a pair of oppositely disposed and facing longitudinally extending grooves 64 for receiving ribs 66 (FIGS. 3 and 4) of the upper valve plate 58 and, thus, when the main hydrant valve 42 is reciprocated by the valve stem 24, it cannot rotate relative to the seat ring. The ribs 66 are each provided with a longitudinally extending groove 68 which is dovetail in section and which is arranged to receive elongated drain valve facing strips 70 (FIGS. 5–7), the elongated drain valve facing strips having generally a cross-sectional configuration complimentary to the groove. The drain valve facing strips 70 are secured to the ribs by bronze, stainless steel, or other suitable corrosion resistant screws 72 (FIG. 2). As will now be apparent, when the main hydrant valve 42 is in the closed position, as shown in FIG. 2, the drain passages 52 in the valve seat ring 36 are open to the interior of the barrel 12 above the main hydrant valve 42 since the elongated drain valve facing strips terminate with their lower end just short of the passages 52. Any water in the hydrant can drain through the passages 52 to the manifold 54 and through the passages 48 to the exterior of the hydrant. However, when the main hydrant valve 42 is moved downwardly to an open position, the drain valve facing strips 70 move downwardly with the upper valve plate 58 and cover the drain passages 42 so that water passing through the shoe 30 into the hydrant barrel 12 cannot escape through the drain passages to the exterior of the hydrant.

Valve facing strips 70 are comprised of a foamed polymeric core 81 and an impervious and solid polymeric outer surface 82. The strips may have at least one attaching device receiving aperture 83 for receiving an appropriate attaching means, such as screws 72. The attaching device will secure the valve facing strips to ribs 66. Thus, one side 85 of the valve facing strip 70 contacts and is secured to ribs 66 while the other side 84 of the valve facing strip contacts the valve seat ring 36. Of course, other means of attaching the valve facing strip to the ribs may be used, or additional means of securing or stabilizing of the strips to the ring may be used. In this latter regard, the valve facing strips may have indentations 89 for receiving a guide or stub projecting from ribs 66 (not shown in the drawings). Alternatively, a projection 86 (see FIG. 3) may be provided on the valve strips to mate with a corresponding recess in ribs 66 for providing attachment and/or stabilization of the valve facing strips. For convenience, the valve strips may be beveled as shown at 87 to allow a more gradual contact with the valve seat ring.

Figure 7:
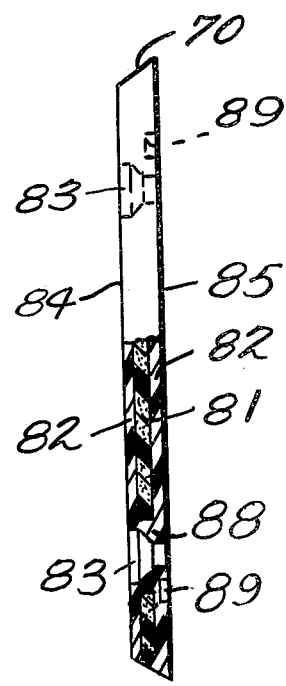
FIG. 7 is a side elevational view of the drain valve facing strip of the present invention, the view being partly in section taken on the line 7—7 of FIG. 5 and diagrammatically showing the polymeric, foam construction of the same.

As will be appreciated, an important feature of the invention is the critical combination of the foamed polymeric core and the impervious and solid polymeric outer surface which overlays the foamed core at every point where the valve facing contacts the other valve member. In the embodiment of FIG. 7, therefore, outer surface 84 must entirely overlay foamed core 81 so that the outer surface overlays the foamed core at every point where the valve facing contacts the valve seat ring. While not absolutely necessary, it is preferred that the outer surface overlay the foamed core, also, at every point where the valve facing contacts the valve member carrying the valve facing. Thus, in the embodiment of FIG. 7, outer surface 85 would also be an impervious and solid polymeric outer surface, since that entire outer surface will contact the valve member carrying the valve facing, i.e. rib 66.

As noted above, the valve facing may have at least one attaching device receiving aperture which extends from the side of the valve facing contacting one valve member to the side of the valve facing contacting the other valve member. It is not necessary for the outer surface to overlay the foamed core at that aperture, since the foamed core is protected in the aperture by the attaching devices passing therethrough. Nevertheless, it is preferred that the outer surface also overlay that aperture as shown in FIG. 7 at 88. Further, when a plurality of the apertures are provided in the valve facing strip, it is preferred that each of the apertures have the outer surface overlaying the apertures.

It should be understood that the outer surface is comprised of substantially unfoamed polymeric material, but it is not necessary that the outer surface be totally devoid of any foaming whatsoever. For example, the strips may be produced by injecting a foamable polymeric material (containing a blowing agent) into a mold cavity in such a manner that foaming commences during the injection step. Thus, the outer surface will foam, but the mold walls may be maintained at a sufficiently high temperature that the foamed composition will collapse to a non-foamed state when contacting the heated mold walls. While this method produces substantially unfoamed polymeric material in the outer surface, some minor amounts of uncollapsed foam may remain. This will not, however, seriously degrade the desired properties of the outer surface.

However, to avoid even the amount of uncollapsed foam associated with the foregoing process, the foamable composition may be injected at such a rate that foaming is not allowed to substantially take place and the foamable composition will contact cooled mold walls which will prevent the foamable composition from substantially foaming. The interior, remaining hot, however, will foam to provide the foamed core. This process, however, does result in even smaller amounts of foam being contained in the outer surface.

As can be appreciated from the foregoing, both of the described methods of producing the foamed core of the valve facing strip results in the outer surface containing a blowing agent. In one case the blowing agent has foamed and the foam has been collapsed and in the other case, the blowing agent has not been allowed to foam. While the presence of the blowing agent will not normally be of any difficulty, especially in non-corrosive service such as fire hydrants and the like, for special or severe services as may be encountered by other embodiments of gate valves, it might be desirable that the outer surface contain no blowing agent. This can be accomplished by injecting into the mold cavity a first polymeric material containing no blowing agent and then injecting into the first polymeric material a second polymeric material which does contain a blowing agent. Foaming can be accomplished as the two materials expand in the mold cavity or the mold cavity can be filled before any foaming takes place and the mold cavity can then be enlarged to provide foaming. These methods do result in the outer surface having no blowing agent therein.

For the sake of conciseness, these well known methods of injection molding an unfoamed outer surface and a foamed core will not be further discussed, since the details of these processes are well known to the art. However, as examples of such processes, see U.S. Pat. Nos. 3,268,636; 3,436,446; 3,531,553 and 3,751,534.

As can be appreciated, the invention departs significantly from prior art efforts in that the valve facing strip is an integral combination of an unfoamed, impervious and solid polymeric outer surface and a foamed polymeric core. The outer surface provides abrasion resistance so that many cycles of the valve operation may be accomplished without wearing away the outer surface and destroying the sealing effect. However, as noted above, sealing in valves of the present nature require the tight wedging of the valve facing strip between the valve element and the valve seat. The rubber strips of the prior art were deformable so as to allow this wedging, but those rubber strips were not compressible. In other words, the deformable rubber was moved into space available so that overall compression of the rubber could take place. As opposed to that function of the rubber, the present valve facing strips are compressible so that the space actually occupied by the strips under compressive forces is less than the space occupied by the strips under no compressive forces. This is, of course, a well known function of a foamed polymeric material. In a sense, the foamed core acts as resilient springs which allow compression of the outer surface into the available space between the valve element and the valve seat and which function continually urges the outer surface into tight contact with the other valve member to effect excellent sealing of the closed valve.

As can also be appreciated, the foamed polymeric core, while being compressible, has a high degree of resiliency in that it is not necessarily subjected to flow forces as is a solid rubber strip and the foamed core is, therefore, capable of continually restoring the valve facing strip to essentially the same shape of the strip prior to compression. This allows the valve facing strip to be considerably larger than the space available between the valve seat and the valve element, since the foam can be compressed and the strip can still fit into that space. Hence, considerable abrasion of the outer surface can take place and yet the valve facing strip will have sufficient material associated therewith to still cause a tight wedging of the valve facing strip between the valve members and, hence, avoid leakage of the closed valve.

However, to ensure these functions, especially of sufficient compressiveness in the valve facing strip and of sufficient outer surface material to allow reasonable loss thereof by abrasion, it is preferred that the thickness of the foamed core to the thickness of the outer surface which contacts the other valve member (for example surface 84 of FIG. 7) be at least 0.5:1 and preferably at least 1:1. Even better results are provided when that ratio is at least 1.5:1 to 5.0:1.

The outer surface can provide yet a further function. The imperviousness can protect the foamed core from corrosive fluids which may be controlled by the valve. This is opposed to, for example, the situation of a leather valve facing where the fluids being controlled by the valve would ultimately soak into and through the leather valve facings. While this is not a substantial problem in water service, such as in a fire hydrant, even in that environment the impervious surface provides the function of avoiding leakage by virtue of the water passing through the foamed core. If the foamed core is a closed cell core, that leakage will be substantially mitigated, but nevertheless the impervious surface is important in that regard.

While the valve facing may be made of a variety of polymeric materials, it is preferred that the polymeric material be a substantially inert thermoplastic material. Preferably, the core material is selected from the group consisting of polyolefins, nylon, polyvinyl chloride, natural and synthetic rubbers and polyesters. Again, the outer surface material can be selected from any inert thermoplastic material, but it is preferred that the outer surface be made of an abrasion resistant polymeric material and to this end it is preferred that the outer surface material be selected from the group consisting of polyolefins, nylon, polyvinyl chloride, polytetrafluroethylene and polyesters.

The core material may be of a different material than the outer surface material, particularly when the method of forming using a first and second injectable material, as described above, is used. However, the outer surface material and the core material may be of the same polymeric material and this will normally be the case when the other two above-described methods are used for producing the valve facing strip.

The core should be foamed sufficiently to provide the functions described above and the foam expansion is not critical so long as those functions are provided. Sufficient resiliency and compressibility are normally achieved with expansion of as little as 1.5 (the expansion being the ratio of the unfoamed volume of the polymeric composition forming the core to the subsequent foamed volume thereof). However, it is preferred that the expansion be 2.0 or higher, e.g., 3.0 or 4.0 or more. Usually the expansion will be between 5.0 and 12.0, e.g., 5.0-8.0.

The foam may be either open cell foam or closed cell foam, but closed cell foam is preferred, since this provides less chance of liquid penetrating the valve facing. Foaming may be accomplished with gaseous or chemical foaming agents, e.g., $CO_2$, chloro-fluorohydrocarbon (Freons), sodium bicarbonate or the conventional diazocarbonamides. The particular foaming agent is not critical and may be chosen as desired.

A full disclosure of suitable blowing agents, polymeric material for the outer surface and polymeric material for the foamed core is contained in U.S. Pat. No. 3,751,534, the entire disclosure of which is incorporated herein by reference and relied upon for details of disclosure.

The following example is illustrative of the invention, but the invention is not limited thereto.

EXAMPLE

Figure 5:
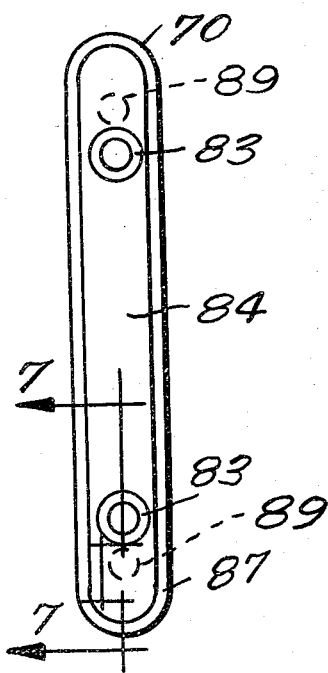
FIG. 5 is an enlarged view of the drain valve facing strip of the present invention looking at the side of the same which seals against the drain passage in the hydrant valve seat assembly.
Figure 6:
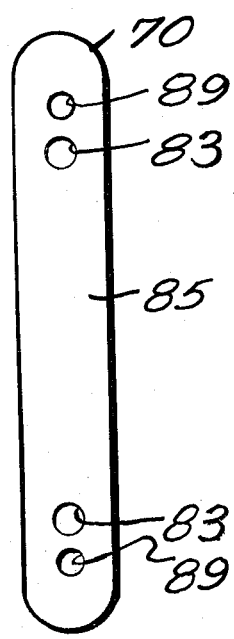
FIG. 6 is a view of the drain valve facing strip of FIG. 5 but looking at the opposite side thereof.

Valve facing strips of the configuration of FIGS. 5-7 were produced with a foamed core and solid substantially unfoamed outer surface by injecting polyethylene with diazocarbonamid blowing agent therein into a mold cavity with mold wall temperatures such that any foam on the outer surface of the molding was collapsed. The valve facing strips were attached to a fire hydrant as described in FIGS. 1-4 and the fire hydrant was cycled under water main pressure and the leakage through the test valve was determined at various numbers of cycles of operation of the valve. As comparisons, a valve facing strip of the same configuration was molded of the same polyethylene, but in such a manner that no foamed core was produced, in other words the strip was solid polyethylene. In yet a further comparison, polyethylene valve facing strips were molded with recesses, in the nature as that proposed by the prior art. Finally, to round out the comparisons, conventional rubber valve facing strips and leather valve facing strips were used in the test.

Each of the strip materials were attached to the same kind of fire hydrant, i.e. that described in FIGS. 1-4, and cycled in the same manner. The results are shown in the table below:

| TYPE OF FACING | AVERAGE LEAKAGE IN CC/5 MIN. | | |
|---|---|---|---|
| | 0 CYCLES | 100 CYCLES | 1000+ CYCLES |
| Leather | 31.5 | 315.0 | NA-Material fails |
| Solid PE | 15.6 | 177.5 | 212.5 |
| Recessed PE | .63 | 1.25 | 1.05 |
| Rubber | .70 | 2.30 | 1.60 |
| Foamed core solid outer surface | .20 | .20 | .20 |

While not shown in the table, the rubber sample actually failed by tearing at 1618 cycles. Additionally, while not shown in the table, the present foamed strip material continued to 17,856 cycles at which number of cycles the average leakage in cc/5 minutes was only 1.0 and at which number of cycles the fire hydrant valving mechanism failed and the valve facing strip was still intact and functioning well. Thus, the present valve facing strip material has a longevity in number of cycles which is greater than the longevity of the mechanical valve assembly.

It should also be carefully noted that the present valve facing strips, initially, had lower leakage than any of the other strips and this lower leakage continued for all of the tested cycles. Indeed, that low leakage rate was maintained throughout the number of tested cycles shown in the table. This is clearly a most surprising and most unexpected result.

The terminology used throughout the application is for the purpose of description and not limitation, the scope of the invention being defined in the appended claims.

What is claimed is:

1. In a valve assembly subject to liquid under high pressures, said valve assembly having valve members including a valve seat and a valve element which is slidably movable relative to the valve seat to open and close the valve assembly and a resilient and deformable valve facing on one of the said valve members whereby the valve facing contacts the other valve member when the valve assembly is closed to tightly wedge and seal the closed valve assembly against liquid leakage, the improvement wherein the valve facing comprises a resilient and deformable foamed polymeric core and an impervious, abrasion resistant solid polymeric outer surface which overlays the foamed core at every point where the valve facing contacts the other valve member and the ratio of the thickness of the foamed core to the thickness of the outer surface is about 0.5:1 up to about 5:1.

2. The valve assembly of claim 1 wherein the outer surface overlays the foamed core at every point where the valve facing contacts the valve member carrying the valve facing.

3. The valve assembly of claim 2 wherein the valve facing has at least one attaching device receiving aperture which extends from the side of the valve facing contacting one valve member to the side of the valve facing contacting the other valve member and the outer surface overlays the foamed core at every point except at the said aperture.

4. The valve assembly of claim 3 wherein the outer surface also overlays the said aperture.

5. The valve assembly of claim 4 wherein there is a plurality of the said apertures.

6. The valve assembly of claim 1 wherein the outer surface comprises substantially unfoamed polymeric material.

7. The valve assembly of claim 6 wherein the outer surface comprises foamed polymeric material which has been collapsed to a non-foamed state.

8. The valve assembly of claim 6 wherein the outer surface comprises foamable but unfoamed polymeric material.

9. The valve assembly of claim 8 wherein the outer surface contains a blowing agent.

10. The valve assembly of claim 6 wherein the outer surface contains no blowing agent.

11. The valve assembly of claim 1 wherein the said ratio is about 1:1.

12. The valve assembly of claim 11 wherein the said ratio is about 1.5:1.

13. The valve assembly of claim 1 wherein the polymeric material of the core is selected from the group consisting of polyolefins, nylon, polyvinyl chloride, natural and synthetic rubbers and polyester.

14. The valve assembly of claim 13 wherein the core material and the outer surface material are the same polymeric material.

15. The valve assembly of claim 1 wherein the polymeric material of the outer surface is selected from the group consisting of polyolefins, nylon, polyvinyl chloride, polytetrafluroethylene and polyesters.

16. The valve assembly of claim 1, wherein the core material is a material different from the outer surface material and the outer surface material is selected from the group consisting of polyolefins, nylon, polyvinyl chloride, polytetrafluoroethylene and polyesters.

17. The valve assembly of claim 16, wherein the outer surface comprises foamed polymeric material which has been collapsed to a non-foamed state.

18. The valve assembly of claim 16, wherein the polymeric material of the core is selected from the group consisting of polyolefins, nylon, polyvinyl chloride, natural and synthetic rubbers and polyester.

19. In a valve assembly subject to liquid under high pressures, said valve assembly having valve members including a valve seat and a valve element which is slidably movable relative to the valve seat to open and close the valve assembly and a resilient and deformable valve facing on one of the said valve members whereby the valve facing contacts the other valve member when the valve assembly is closed to tightly wedge and seal the closed valve assembly against liquid leakage, the improvement wherein the valve facing comprises a resilient and deformable foamed polymeric core and an impervious, abrasion resistant solid polymeric outer surface which overlays the foamed core at every point where the valve facing contacts the other valve member, the ratio of the thickness of the foamed core to the thickness of the outer surface is about 0.5:1 up to about 5:1 and thus providing sufficient compressiveness and sufficient outer space material to allow for loss thereof by abrasion.

20. The valve assembly of claim 19, wherein said valve facing contacts the outer of said valve members and is removably attached to the inner of the other of said valve members.

21. The valve assembly of claim 19, wherein said valve facing is corrosion resistant.

22. The valve assembly of claim 19, wherein said foamed polymeric core is closed cell core.

23. The valve assembly of claim 19, wherein said foamed polymeric core is an open cell core.

24. The valve assembly of claim 19, wherein the outer surface comprises substantially unfoamed polymeric material.

25. The valve assembly of claim 19, wherein the core material and the outer surface material are the same polymeric material.

* * * * *